United States Patent [19]

Noonan et al.

[11] Patent Number: 5,785,460
[45] Date of Patent: Jul. 28, 1998

[54] ROTATABLE BRACKET FOR CONNECTING TUBES OF DIFFERING CROSS SECTION

[75] Inventors: James Thomas Noonan, Johnston; Terry Lee Lowe, Ankeny, both of Iowa

[73] Assignee: Deere & Company, Moline, Ill.

[21] Appl. No.: 671,038

[22] Filed: Jun. 27, 1996

[51] Int. Cl.$^6$ ................................................. B25G 3/36
[52] U.S. Cl. .................... 403/388; 403/385; 403/394; 403/400; 403/3; 172/681
[58] Field of Search ........................ 403/385, 388, 403/394, 400, 3, 4; 172/681, 776

[56] References Cited

U.S. PATENT DOCUMENTS

| | | | |
|---|---|---|---|
| 263,426 | 8/1882 | O'Brien | 403/388 |
| 397,138 | 2/1889 | Moore | 403/394 |
| 893,311 | 7/1908 | Davis | 403/394 |
| 900,545 | 10/1908 | Humiston | 403/388 |
| 1,931,101 | 10/1933 | Beckstrom | 403/388 |
| 2,101,317 | 12/1937 | Lemieux | 403/385 X |
| 2,595,352 | 5/1952 | Graham | 172/681 |
| 2,617,346 | 11/1952 | Jeoffroy | 172/681 |
| 3,415,554 | 12/1968 | Papayoti | 403/400 X |
| 5,632,567 | 5/1997 | Lowe et al. | 403/3 |

OTHER PUBLICATIONS

Deere & Company, Deere & Company brochure entitled "Cultivators, Thinners and Sprayers", 3 pages, dated Jan. 1985, Published in the U.S.A.

*Primary Examiner*—Kenneth J. Dorner
*Assistant Examiner*—Bruce A. Lev

[57] ABSTRACT

A tube clamp assembly is provided having a one-piece clamp or casting with four clamping and aligning lugs projecting from each side of the casting. The four lugs on the first side of the casting are symmetrically arranged at the corner of an imaginary square and have two sets of clamping and aligning surfaces that lie in planes perpendicular to each other. The surfaces are spaced apart a distance equal to the distance between the faces of a first tube so that the casting can embrace the tube sides in either a first position or a second position rotated 90 degrees from the first position. On the second side of the casting, four lugs similar to the lugs on the first side project the opposite direction and also define two sets of clamping and aligning surfaces. The distance between the clamping and aligning surfaces varies on the second side so that when the casting is in the first rotated position on the first tube, a second tube of a preselected size can be accommodated between the surfaces at an angle of 90 degrees relative to the first tube. When the casting is in the second rotated position, another tube of size different from the preselected size can be accommodated perpendicular to the first tube.

13 Claims, 2 Drawing Sheets

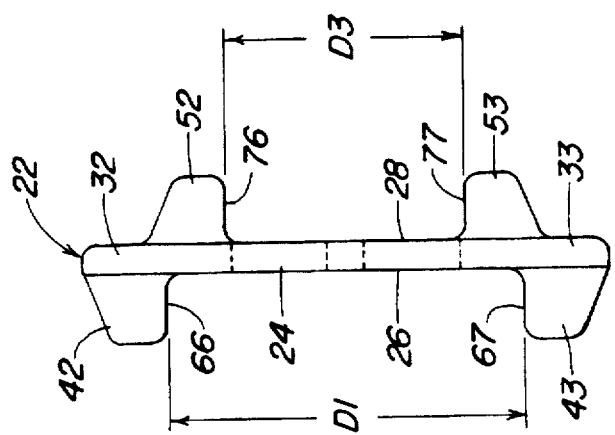
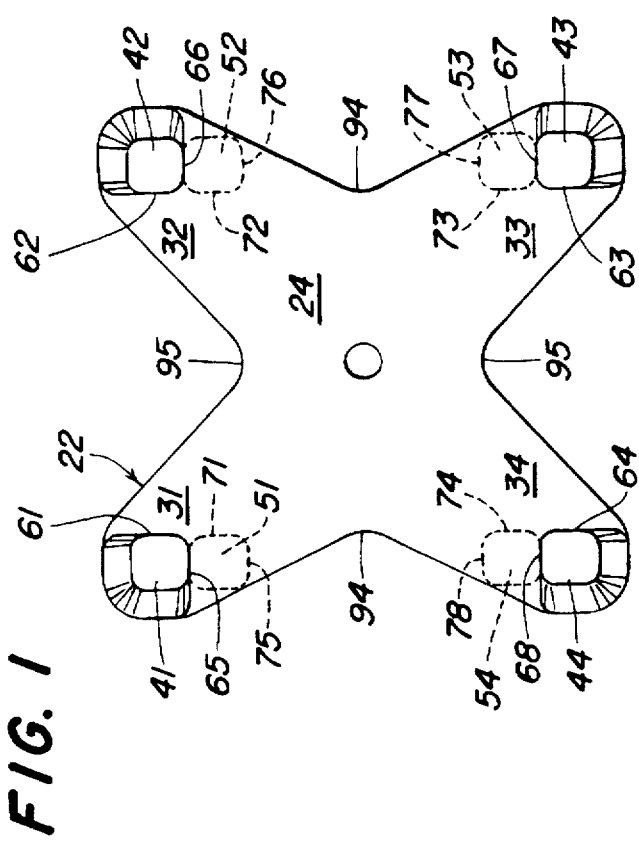
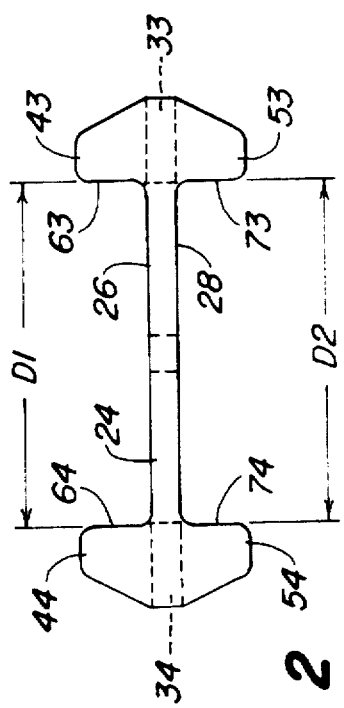

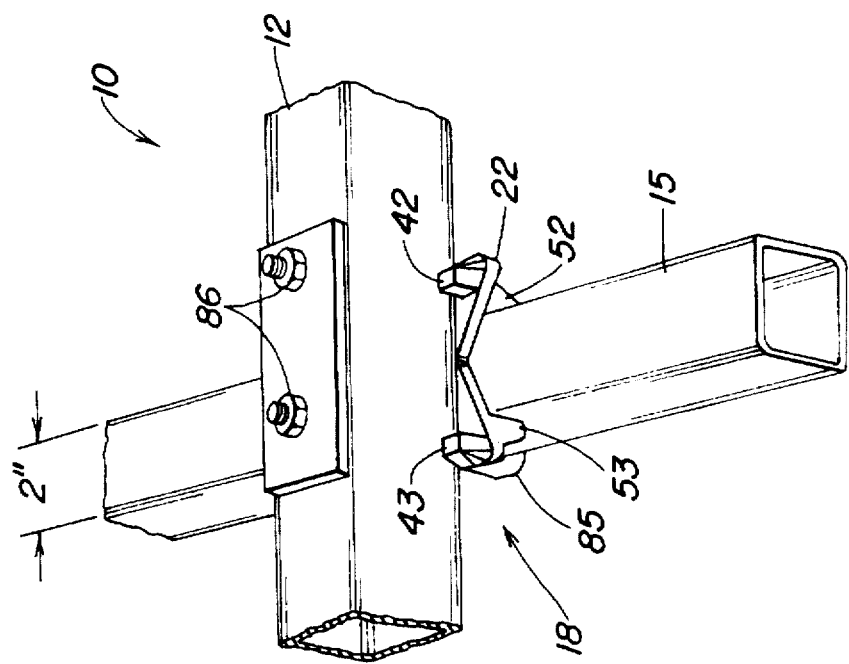
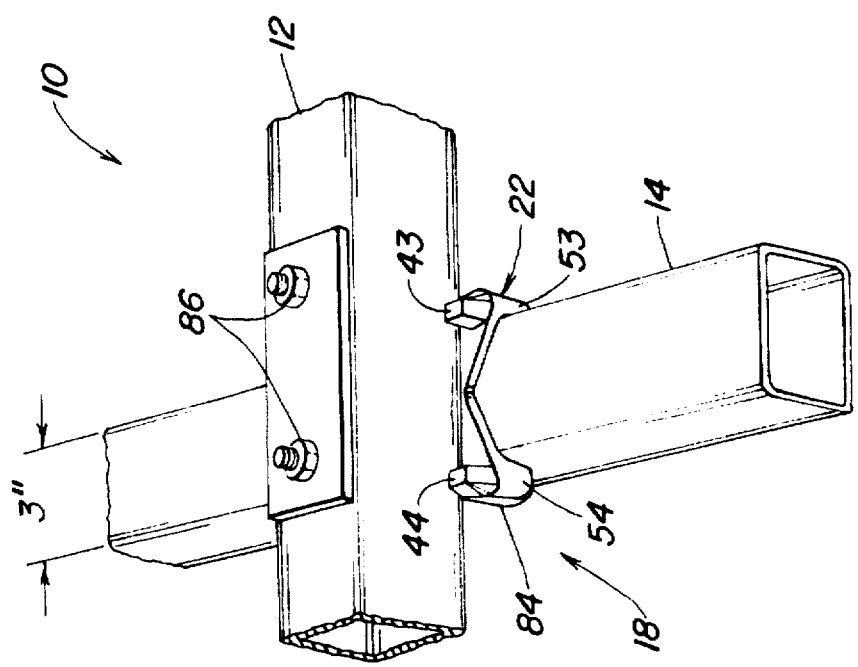

ROTATABLE BRACKET FOR CONNECTING TUBES OF DIFFERING CROSS SECTION

BACKGROUND OF THE INVENTION

1) Field of the Invention

The present invention relates generally to brackets for use with agricultural implements, and, more specifically, to a bracket for connecting first and second tubes and accommodating different tube sizes with a single bracket.

2) Related Art

In agricultural implements, tubes of differing sizes are clamped together to define various configurations of frames and rigs. Cultivator rigs typically include a fore-and-aft extending tube or beam with one or more transversely extending tubes clamped to the tube. Large torque loads are often encountered by the rigs, and a special clamp is required for each tube size combination to resist such torque loads. For example, if a 2×2 inch square tube is clamped to a 3×3 inch square beam, a one-piece clamp is used with a bolt assembly for a firm fit. If a 3×3 inch tube is clamped to the same beam, a second one-piece clamp with a similar bolt assembly is used to accommodate the larger dimension while still providing a secure fit between the beam and tube that will resist the large torque loads.

Providing a different one-piece clamp for each beam-tube combination increases the number of components that must be manufactured and stocked for a particular implement. Adjustable clamps to facilitate connection of different sized tubes and beams are available, but these are more complex and expensive and do not provide as firm a torque-resisting connection compared to a one-piece bracket and bolt assembly combination. In many agricultural applications, including the cultivator rig application, the clamp must provide quick adjustment of the relative location of the beam and tube to accommodate varying tool requirements in different crop and soil conditions and row spacings.

BRIEF SUMMARY OF THE INVENTION

It is therefore an object of the present invention to provide an improved bracket structure for an agricultural implement. It is a further object to provide such a structure which overcomes most or all of the aforementioned problems.

It is a further object of the invention to provide an improved tube bracket structure for tubes of differing cross section, wherein the bracket structure is simple in construction. It is an additional object to provide such a structure which eliminates need for separate clamps for different tube size combinations and which still provides a positive torque-resisting connection.

It is a further object to provide an improved tube bracket structure which is simple in construction and can firmly clamp together at least two different sized tubes while still facilitating quick relative adjustment between the tubes.

It is another object of the invention to provide an improved tube bracket structure with a one-piece bracket which firmly clamps a first tube to a second tube of a preselected size, and wherein the bracket is rotatable 90 degrees relative to the first tube to firmly clamp a different sized tube to the first tube.

In accordance with the above objects, a tube clamp assembly is provided having a one-piece clamp or casting with four clamping and aligning lugs projecting from each side of the casting. The four lugs on the first side of the casting are symmetrically arranged at the corner of an imaginary square and have two sets of clamping and aligning surfaces that lie in planes perpendicular to each other. The surfaces are spaced apart a distance equal to the distance between the faces of a first tube so that the casting can embrace the tube sides in either a first position or a second position rotated 90 degrees from the first position. On the second side of the casting, four lugs similar to the lugs on the first side project the opposite direction and also define two sets of clamping and aligning surfaces. However, the distance between the clamping and aligning surfaces varies on the second side so that when the casting is in the first rotated position on the first tube, a second tube of a preselected size can be accommodated between the surfaces at an angle of 90 degrees relative to the first tube. When the casting is in the second rotated position, another tube of size different from the preselected size can be accommodated perpendicular to the first tube.

The structure is simple and inexpensive in construction, has a minimum number of parts, and provides positive clamping between a first tube and either one of at least two different sized second tubes. By simply rotating the casting on the first tube, either one of the second tubes can be accommodated. The casting, used with a correspondingly sized U-bolt, resists torque loads in even the most demanding conditions. The lug arrangement on the casting provides a narrow, compact structure with good clearance characteristics. Little or no excess material is required in the casting over that necessary for an ordinary casting that would accommodate only a single combination of tube sizes. The clamp assembly allows for easy positioning of one tube relative to another by simply loosening the clamping U-bolt and sliding one tube between the alignment lugs of the casting.

These and other objects, features and advantages of the present invention will become apparent to one skilled in the art upon reading the following detailed description in view of the drawings.

BRIEF DESCRIPTION OF THE DRAWINGS

FIG. 1 is a top view of the bracket for a tube clamp assembly.

FIG. 2 is a side view of the bracket of FIG. 1.

FIG. 3 is an end view of the bracket of FIG. 1.

FIG. 4 is a perspective view of the tube clamp assembly securing a first tube to a second tube.

FIG. 5 is a view similar to that of FIG. 4 but showing the clamp assembly securing the first tube to a second tube that differs in size from the second tube shown in FIG. 4.

DETAILED DESCRIPTION OF THE PREFERRED EMBODIMENT

Referring to the drawing figures, therein is shown a portion of an agricultural implement indicated generally at 10 in FIGS. 4 and 5. As shown, the portion 10 is part of a cultivator rig and includes a fore-and-aft extending tube or beam 12 and a tool-carrying transverse tube 14 of first cross-sectional size (FIG. 4) or a tube 15 of second cross-sectional size (FIG. 5) secured at a right angle to the beam 12 by a tube clamp assembly indicated generally at 18. The beam 12 and tubes 14 and 15 are fabricated from conventional tube stock of square or rectangular cross section.

The tube clamp assembly 18 includes a one-piece clamp or bracket 22, preferably a metal casting, having a central portion 24 (FIGS. 1–3) with upper and lower planar surfaces 26 and 28, respectively, adapted to fit against the bottom of the beam 12 and the top of either the tube 14 or 15. Four arm-like members 31, 32, 33, and 34 project radially outwardly from the portion 24. Primary clamping lugs 41, 42, 43 and 44 project upwardly from the respective arms 31-34. Secondary clamping lugs 51-54 project downwardly in the opposite direction from the arms 31-34. As best seen in FIGS. 1-3, the primary lugs 41-43 are spaced at the corners of an imaginary square so that the bracket 22 can be mounted in either of two rotated positions relative to the beam 12, wherein the second rotated position (FIG. 5) is offset 90 degrees from the first position (FIG. 4). The secondary lugs 51-54 are spaced at the corners of an imaginary rectangle to provide two different lug spacings so the bracket 22 receives the larger tube 14 when in a first rotated position and the smaller tube 15 when rotated to the second position.

The lugs 41-44 include a first set of innermost faces 61-64, respectively, lying planes spaced a distance D1 apart for embracing the beam 12 when the bracket 22 is in the position shown in FIG. 4. Another set of innermost faces 65-68 lying at right angles to the faces 61-64 in spaced planes also a distance D1 apart embrace the beam 12 when the bracket 22 is in the position shown in FIG. 5. The lugs 51-54 define similar sets of lug faces 71-74 and 75-78, but the distance (D2) between the planes defined by the faces 72,73 and 71,74 (FIG. 2) is greater than the distance (D3) between the planes defined by the faces 75,76 and 77,78 (FIG. 3). As shown, D1 is equal to D2, and D3 is smaller than D1. By way of example, D1 and D2 can be approximately three inches and D3 can be two inches so that the clamp 22 can mount either a three inch tubing 14 (FIG. 4) or a two inch tubing 15 (FIG. 5) to a three inch beam 12.

To firmly secure the beam 12 and tubing 14 or 15 together, a U-bolt 84 or 85 is extended upwardly around the tubing and through apertures in the upper and lower faces of the beam 12 and nuts 86 are tightened unto the threaded ends of the U-bolt to draw the beam 12 and tubing tightly against the opposite faces of the clamp 22. The clamp 22 includes radially inward portions 94 to accommodate the wider U-bolt 84 snugly around the portions 94 when clamping the larger tubing 14 to the beam 12. Radially inward portions 95 accommodate the narrower U-bolt 85. Preferably, the spacing between the portions 94 is approximately equal to but slightly less than D1 and D2, and the spacing between the portions 95 is approximately equal to but slightly less than D3, to provide a firm connection. Therefore, for the example given above wherein a three inch beam 12 mounts either a three inch tube 14 or a two inch tube 15, the same clamp 22 can be used by simply rotating the clamp 90 degrees on the beam 12 between the large tube accommodating position shown in FIG. 4 and the small tube accommodating position shown in FIG. 5. Relative adjustment between the beam and the tube can be made simply by loosening the nuts 86 and sliding the tube in the bracket.

Having described the preferred embodiment, it will become apparent that various modifications can be made without departing from the scope of the invention as defined in the accompanying claims.

We claim:

1. In an implement including first and second tubes, the first tube having a rectangular cross section with opposed parallel faces spaced apart a preselected distance, the second tube having opposite sides spaced either a first distance or a second distance apart, the second distance being greater than the first distance, bracket structure adapted for mounting one face of the second tube adjacent one of the faces of the first tube regardless of the spacing between the opposite sides of the second tube, the bracket structure comprising:

a bracket rotatable relative to the first tube between first and second mounting positions, wherein the first position is rotated 90 degrees from the second position, the bracket having a first surface abutting the one face of the first tube and a second surface abutting the one face of the second tube, first and second pairs of primary clamping lugs projecting from the first surface, the primary clamping lugs defining two sets of embracing surfaces located at right angles with respect to each other, the sets of embracing surfaces spaced equal distances apart so that the first set of embracing surfaces embrace the faces of the first tube when the bracket is in the first mounting position and the second set of embracing surfaces embrace the faces of the first tube when the bracket is in the second mounting position; and wherein the bracket further comprises third and fourth pairs of secondary clamping lugs projecting from the second surface, the third and fourth pairs of secondary clamping lugs defining first embracing surfaces spaced apart a distance approximately equal to the first distance to facilitate mounting of a second tube with sides spaced the first distance apart, the third and fourth pairs of secondary clamping lugs defining second embracing surfaces located at right angles with respect to the first embracing surfaces and spaced apart a distance approximately equal to the second distance to facilitate mounting of the second tube with sides spaced the second distance apart; and bolt structure for securing the first and second tubes in the bracket.

2. The bracket structure as set forth in claim 1 wherein the bracket comprises a one-piece casting.

3. The bracket structure as set forth in claim 1 wherein the primary lugs are symmetrically spaced an equal distance apart in a square pattern, and the secondary lugs are spaced in a rectangular pattern.

4. The bracket structure as set forth in claim 3 wherein bracket comprises four radially projecting planar arm portions, each arm portion supporting one primary clamping lug and one secondary clamping lug.

5. The bracket structure as set forth in claim 4 wherein two of the planar arm portions have primary and secondary clamping lugs that are aligned, and the other two planar arm portions have primary and secondary clamping lugs that are offset from each other.

6. The bracket structure as set forth in claim 4 including narrowed portions between the planar arm portions defining a bolt accommodation space for the bolt structure.

7. The bracket structure as set forth in claim 6 wherein the narrowed portions include a first pair of opposite areas spaced a distance apart approximately equal to the first distance and a second pair of opposite areas spaced a distance apart approximately equal to the second distance.

8. The bracket structure as set forth in claim 7 wherein the bolt structure comprises a U-bolt having sidelegs spaced apart a distance approximately equal to the spacing between the opposite sides of the second tube, the U-bolt having ends projecting through the first tube.

9. In an implement including first and second tubes, the first tube having a rectangular cross section with opposed parallel faces spaced apart a preselected distance, the second tube having opposite sides spaced either a first distance or a second distance apart, the second distance being greater than the first distance, bracket structure adapted for mounting one face of the second tube adjacent one of the faces of the first tube regardless of the spacing between the opposite sides of the second tube, the bracket structure comprising:

a bracket having a first side adapted for mounting against the first tube and a second side adapted for mounting against the second tube;

a plurality of first and second projections located on the first and second sides, respectively, of the bracket, the first projections defining first and second pairs of spaced embracing surfaces located at right angles with respect to each other for mounting the bracket on the first tube with the first side positioned adjacent one of the faces of the first tube in a first position relative to the first tube and in a second position rotated 90 degrees relative to the first position, the second projections defining third and fourth pairs of embracing surfaces located at right angles with respect to each other, the embracing surfaces being spaced different distances apart; and wherein when the bracket is in the first position, the second projections receive the second tube with sides spaced the first distance apart with the third pair of embracing surfaces embracing the second tube, and when the bracket is rotated to the second position, the second projections receive the second tube with sides spaced the second distance apart with the fourth pair of embracing surfaces embracing the second tube.

10. The bracket structure as set forth in claim 9 wherein the first projections comprise four lugs spaced an equal distance apart in a square pattern, and the second projections comprise four lugs spaced in a rectangular pattern, and wherein the second position of the bracket is offset 90 degrees from the first position of the bracket.

11. The bracket structure as set forth in claim 10 wherein the bracket comprises a one-piece member having a central section and four arms projecting radially from the central section, and wherein each of the arms supports one of the first lugs and one of the second lugs.

12. The bracket structure as set forth in claim 11 further comprising two pairs of indented portions on the central section, and U-bolt structure embracing one of the pairs of the indented portions adapted for securing the first and second tubes against the bracket.

13. The bracket structure as set forth in 10 wherein the first and second lugs include orthogonal portions defining the embracing surfaces.

* * * * *